United States Patent
Satomi et al.

(10) Patent No.: US 9,596,478 B2
(45) Date of Patent: Mar. 14, 2017

(54) IMAGE COMPRESSING/DECOMPRESSING APPARATUS AND IMAGE FORMING APPARATUS

(71) Applicant: KYOCERA Document Solutions Inc., Osaka (JP)

(72) Inventors: Seiki Satomi, Osaka (JP); Toshiaki Mutsuo, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 15/036,795

(22) PCT Filed: Nov. 10, 2014

(86) PCT No.: PCT/JP2014/079752
§ 371 (c)(1),
(2) Date: May 13, 2016

(87) PCT Pub. No.: WO2015/076140
PCT Pub. Date: May 28, 2015

(65) Prior Publication Data
US 2016/0277754 A1    Sep. 22, 2016

(30) Foreign Application Priority Data
Nov. 20, 2013    (JP) .................................. 2013-240292

(51) Int. Cl.
*G06K 9/36* (2006.01)
*H04N 19/44* (2014.01)
(Continued)

(52) U.S. Cl.
CPC ............. *H04N 19/44* (2014.11); *H04N 1/648* (2013.01); *H04N 19/102* (2014.11);
(Continued)

(58) Field of Classification Search
CPC .. H04N 19/107; H04N 19/117; H04N 19/124; H04N 19/126; H04N 19/127;
(Continued)

(56) References Cited

U.S. PATENT DOCUMENTS

| | | | |
|---|---|---|---|
| 7,103,103 B2 * | 9/2006 | Prakash | H04N 19/52 375/240.25 |
| 7,116,831 B2 * | 10/2006 | Mukerjee | H04N 19/117 375/240.13 |
| 2014/0003498 A1 * | 1/2014 | Sullivan | H04N 19/0009 375/240.03 |

FOREIGN PATENT DOCUMENTS

| | | |
|---|---|---|
| JP | H05-336379 | 12/1993 |
| JP | 2005-101866 | 4/2005 |
| JP | 2010-147895 | 7/2010 |

\* cited by examiner

*Primary Examiner* — Jose Couso

(57) ABSTRACT

An offset calculating unit (2) performs an offset process for a luma plane and/or chroma planes where the offset process compresses a pixel value range by a predetermined offset except for a saturation value. A compression processing unit (3) performs a lossy compression process using frequency conversion for the luma plane and the chroma planes after the offset process performed by the offset calculating unit (2). Further, a decompression processing unit (4) decompresses compressed data generated in the compression process performed by the compression processing unit (3) to a luma plane and chroma planes. An inverse offset calculating unit (5) performs an inverse offset process for a plane for which the offset process has been performed among the luma plane and the chroma planes after decompression by the decompression processing unit (4) where the inverse offset process expands a pixel value range by the offset.

4 Claims, 3 Drawing Sheets

(51) Int. Cl.

| | |
|---|---|
| *H04N 19/102* | (2014.01) |
| *H04N 19/136* | (2014.01) |
| *H04N 19/186* | (2014.01) |
| *H04N 19/182* | (2014.01) |
| *H04N 19/86* | (2014.01) |
| *H04N 1/64* | (2006.01) |

(52) U.S. Cl.
CPC ......... *H04N 19/136* (2014.11); *H04N 19/182* (2014.11); *H04N 19/186* (2014.11); *H04N 19/86* (2014.11); *H04N 1/64* (2013.01)

(58) Field of Classification Search
CPC .. H04N 19/172; H04N 19/174; H04N 19/186; H04N 19/20; H04N 19/30; H04N 19/33; H04N 19/423; H04N 19/439; H04N 19/44; H04N 19/46; H04N 19/517; H04N 19/52; H04N 19/523; H04N 19/59; H04N 19/597; H04N 19/61; H04N 19/70; H04N 19/80; H04N 19/82; H04N 19/85; H04N 19/86; H04N 1/64; H04N 1/648; H04N 19/102; H04N 19/136; H04N 19/182; G06T 5/002; G06T 5/003; G06T 5/20; G06T 2207/10024; G06F 13/1663; G09G 5/39; G09G 2360/12; G09G 2360/122

See application file for complete search history.

IMAGE COMPRESSING/DECOMPRESSING APPARATUS AND IMAGE FORMING APPARATUS

TECHNICAL FIELD

The present invention relates to an image compressing/decompressing apparatus and an image forming apparatus.

BACKGROUND ART

It is known that image compression such as JPEG (Joint Photographic Experts Group) using spatial frequency conversion such as DCT (Discrete Cosine Transform) results in low image quality due to mosquito noise in an edge part of a character or the like. In particular, if an image is printed on a print paper sheet that has a white background, such low image quality is emphasized because toner is put on such a part that should be white as original of the background.

An image forming apparatus separates only a character part and performs gamma conversion for the separated character part and thereby removes its low density part, and consequently removes mosquito noise (see PATENT LITERATURE #1).

CITATION LIST

Patent Literature

Patent Literature #1:
Japanese Patent Laid-open Application Publication H5-336379.

SUMMARY OF INVENTION

Technical Problem

However the aforementioned method is required to identify the character part and separate it, and therefore the process causes a large load.

The present invention has been made in view of the aforementioned problem. It is an object of the present invention to achieve an image compressing/decompressing apparatus and an image forming apparatus restraining mosquito noise on a white background by a simple process.

Solution to Problem

An image compressing/decompressing apparatus according to the present invention includes: an offset calculating unit that performs an offset process for a luma plane and/or chroma planes, the offset process compressing a pixel value range by a predetermined offset except for a saturation value; a compression processing unit that performs a lossy compression process using frequency conversion for the luma plane and the chroma planes after the offset process performed by the offset calculating unit; a decompression processing unit that decompresses compressed data generated in the compression process performed by the compression processing unit to a luma plane and chroma planes; and an inverse offset calculating unit that performs an inverse offset process for a plane for which the offset process has been performed among the luma plane and the chroma planes after decompression by the decompression processing unit, the inverse offset process expanding a pixel value range by the offset.

An image forming apparatus according to the present invention includes the aforementioned image compressing/decompressing apparatus.

Advantageous Effects of Invention

On the basis of the present invention, mosquito noise on a white background is restrained by a simple process.

DESCRIPTION OF EMBODIMENTS

Hereinafter, an embodiment of the present invention will be explained with reference to drawings.

Figure 1:
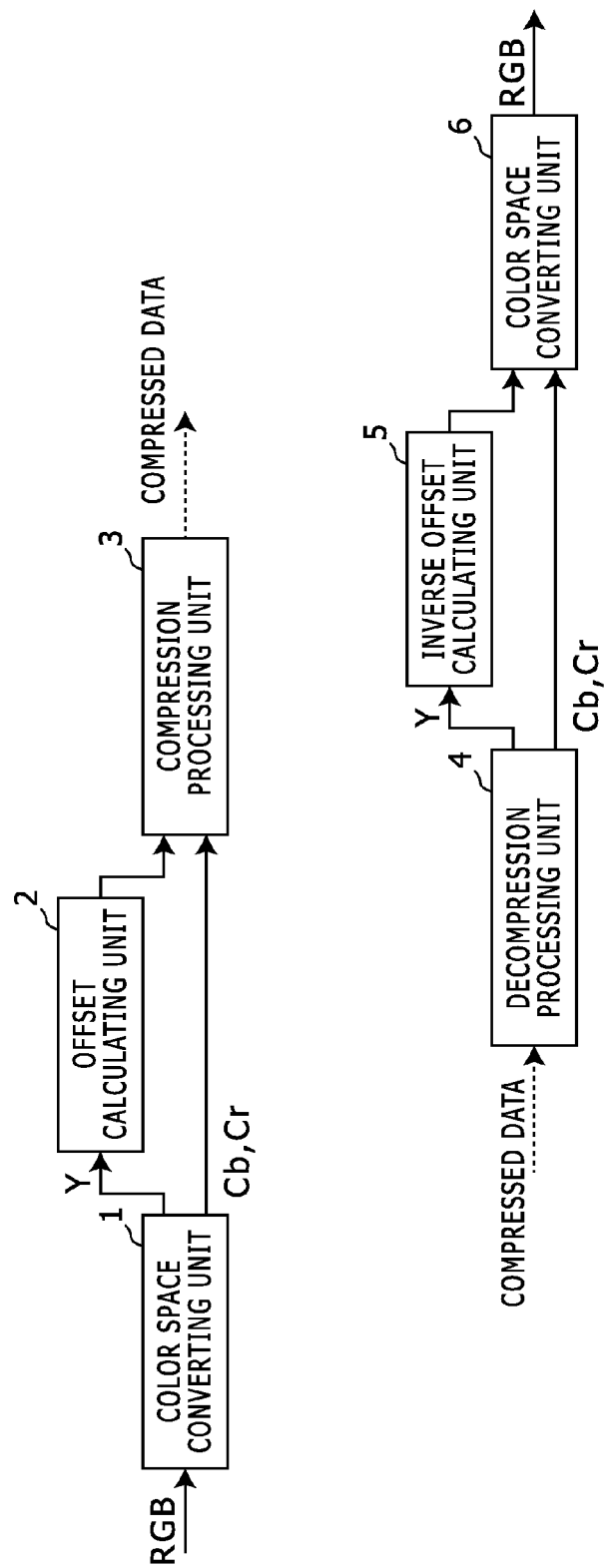
FIG. 1 shows a block diagram that indicates a configuration of an image compressing/decompressing apparatus according to an embodiment of the present invention.

FIG. 1 shows a block diagram that indicates a configuration of an image compressing/decompressing apparatus according to an embodiment of the present invention. This image compressing/decompressing apparatus is included, for example in an image forming apparatus (i.e. a printer, a copier, a multi function peripheral or the like).

For example, in a print function, RGB image data is generated from PDL (Page Description Language) data. Further, in a copy function, RGB image data is obtained using a built-in scanner.

The image compressing/decompressing apparatus shown in FIG. 1 includes a color space converting unit 1, an offset calculating unit 2, a compression processing unit 3, a decompression processing unit 4, an inverse offset calculating unit 5, and a color space converting unit 6.

The color space converting unit 1 converts the aforementioned RGB data to a luma plane and chroma planes (here, a Y plane, and a Cb plane and a Cr plane).

The offset calculating unit 2 performs an offset process for the luma plane and/or the chroma planes (here only the luma plane) where the offset process compresses a pixel value range by a predetermined offset except for a saturation value (e.g. 255).

Figure 2:
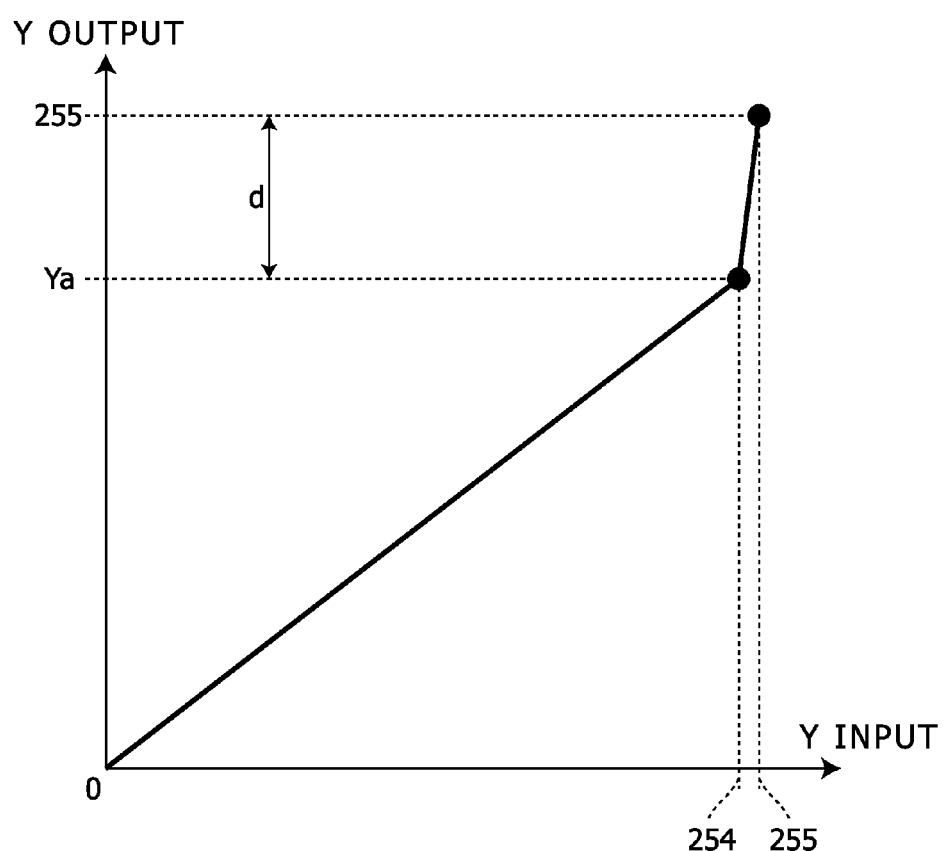
FIG. 2 shows a diagram that explains an input-output characteristic of an offset process performed by an offset calculating unit 2 in FIG. 1.

FIG. 2 shows a diagram that explains an input-output characteristic of an offset process performed by the offset calculating unit 2 in FIG. 1. For example, as shown in FIG. 2, for a Y plane, the offset calculating unit 2 compresses a pixel value range from 0 to 254 to 0 to Ya (Ya=255−d, d is an offset, and d>1), and keeps a pixel value of 255 corresponding to a background color (white) as is.

The compression processing unit 3 performs a lossy compression process using frequency conversion for the luma plane and the chroma planes after the offset process performed by the offset calculating unit. For example, the compression processing unit 3 performs the lossy compression process using discrete cosine conversion (DCT) or wavelet conversion.

The decompression processing unit 4 decompresses compressed data generated in the compression process performed by the compression processing unit 3 to a luma plane and chroma planes.

The inverse offset calculating unit 5 performs an inverse offset process for a plane for which the aforementioned offset process has been performed (here, only the luma plane) among the luma plane and the chroma planes after decompression by the decompression processing unit 4 where the inverse offset process expands a pixel value range by the aforementioned offset d. Consequently, the compression process is performed by the compression processing unit 3 after compressing toward the low luminance side a pixel value range of a high luminance part (a part near white of the background) where mosquito noise easily occurs, and a pixel value range is expanded toward the high luminance side when the decompression processing unit 4 performs the decompression, and therefore even if mosquito noise appears in the high luminance side, the mosquito noise gets inconspicuous.

The color space converting unit 6 converts the luma plane after the inverse offset process performed by the inverse offset calculating unit 5 and the chroma planes obtained by the decompression performed by the decompression processing unit 4 to RGB data.

Figure 3:
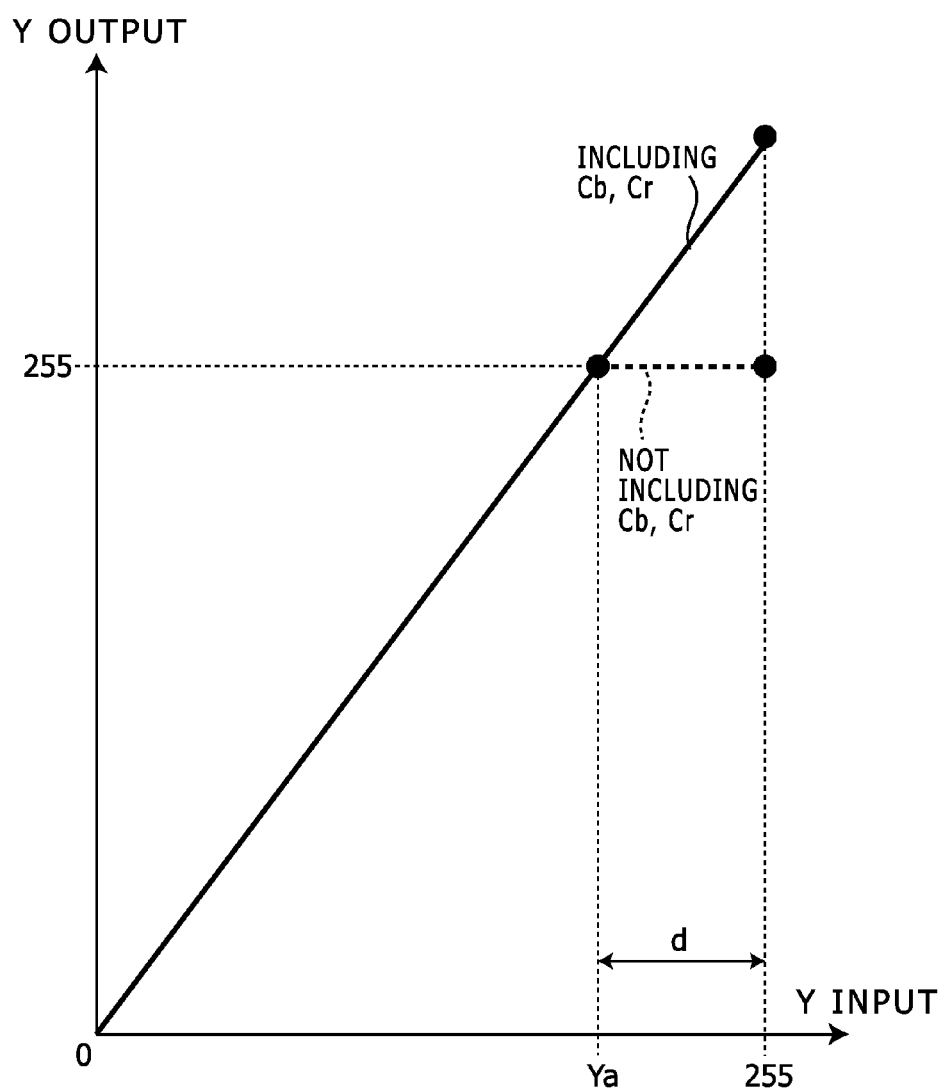
FIG. 3 shows a diagram that explains an input-output characteristic of an inverse offset process performed by an inverse offset calculating unit 5 in FIG. 1.

FIG. 3 shows a diagram that explains an input-output characteristic of an inverse offset process performed by the inverse offset calculating unit 5 in FIG. 1. For example, if the offset process was performed of the characteristic as shown in FIG. 2, then for the Y plane, the inverse offset calculating unit 5 expands the pixel value range from 0 to Ya to 0 to 255.

As shown in FIG. 3, in case of an image with no chroma components, if due to mosquito noise the input value exceeds Ya at a pixel, the output value is cut off at the saturation value (=255); in case of an image with chroma components, if due to mosquito noise the input value exceeds Ya at a pixel (i.e. the output value after the inverse offset process exceeds the saturation value (=255)), the chroma values of this pixel are set as zero.

Specifically, if the inverse offset calculating unit 5 did not cut off the pixel value at the aforementioned saturation value in the luma plane after the inverse offset process, then the color space converting unit 6 converts to an achromatic color a pixel value exceeding the saturation value in the luma plane after the inverse offset process by the inverse offset calculating unit 5 (i.e. sets Cr value and Cb value as 128). Consequently, even if mosquito noise occurs in case of an image with a chromatic color, coloring due to mosquito noise is canceled and therefore, the mosquito noise gets inconspicuous.

The following part explains a behavior of the aforementioned apparatus.

As mentioned, when RGB data is obtained, the color space converting unit 1 converts the RGB data to YCbCr planes.

The offset calculating unit 2 performs the aforementioned offset process for the Y plane among these planes.

Subsequently, the compression processing unit 3 performs a compression process for the Y plane after the offset process and the Cb plane and the Cr plane using JPEG method using DCT and Huffman coding, JPEG2000 method using wavelet conversion and arithmetic coding, or the like.

In this manner, compressed data is generated for the inputted RGB data. This compressed data is stored in a storage device, and when using the original RGB data, the original RGB data is restored from the compressed data read from the storage device.

At this time, the decompression processing unit 4 decompresses the compressed YCbCr planes. At the time when finishing the decompression, the offset process keeps effect on the Y plane, and then the inverse offset calculating unit 5 performs the inverse offset process as mentioned.

Subsequently, the color space converting unit 6 converts the Y plane after the inverse offset process performed by the inverse offset calculating unit 5 and the Cb plane and the Cr plane obtained by the decompression performed by the decompression processing unit 4 to RGB data.

In the aforementioned embodiment, the offset calculating unit 2 performs an offset process for a luma plane and/or chroma planes where the offset process compresses a pixel value range by a predetermined offset except for a saturation value, and the compression processing unit 3 performs a lossy compression process using frequency conversion for the luma plane and the chroma planes after the offset process performed by the offset calculating unit 2. Further, the decompression processing unit 4 decompresses compressed data generated in the compression process performed by the compression processing unit 3 to a luma plane and chroma planes, and the inverse offset calculating unit 5 performs an inverse offset process for a plane for which the offset process has been performed among the luma plane and the chroma planes after decompression by the decompression processing unit 4 where the inverse offset process expands a pixel value range by the offset.

Consequently, mosquito noise on a white background is restrained by a simple process.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

INDUSTRIAL APPLICABILITY

For example, the present invention is applicable to compression of image data performed to keep an image in an image forming apparatus.

The invention claimed is:

1. An image compressing/decompressing apparatus, comprising:
   an offset calculating unit that performs an offset process for a luma plane and/or chroma planes, the offset process compressing a pixel value range by a predetermined offset except for a saturation value;
   a compression processing unit that performs a lossy compression process using frequency conversion for the luma plane and the chroma planes after the offset process performed by the offset calculating unit;
   a decompression processing unit that decompresses compressed data generated in the compression process performed by the compression processing unit to a luma plane and chroma planes; and
   an inverse offset calculating unit that performs an inverse offset process for a plane for which the offset process has been performed among the luma plane and the chroma planes after decompression by the decompression processing unit, the inverse offset process expanding a pixel value range by the offset;
   wherein the offset calculating unit performs the offset process for only the luma plane; and the inverse offset calculating unit performs the inverse offset process for only the luma plane.

2. The image compressing/decompressing apparatus according to claim 1, further comprising a color converting unit that converts to an achromatic color a pixel value exceeding the saturation value in the luma plane after the inverse offset process by the inverse offset calculating unit.

3. The image compressing/decompressing apparatus according to claim 1, wherein the compression processing unit performs the lossy compression process using discrete cosine conversion or wavelet conversion.

4. An image forming apparatus, comprising:
an image compressing/decompressing apparatus;
wherein the image compressing/decompressing apparatus comprises:
an offset calculating unit that performs an offset process for a luma plane and/or chroma planes, the offset process compressing a pixel value range by a predetermined offset except for a saturation value;
a compression processing unit that performs a lossy compression process using frequency conversion for the luma plane and chroma planes after the offset process performed by the offset calculating unit;
a decompression processing unit that decompresses compressed data generated in the compression process performed by the compression processing unit to a luma plane and chroma planes; and
an inverse offset calculating unit that performs an inverse offset process for a plane for which the offset process has been performed among the luma plane and the chroma planes after decompression by the decompression processing unit, the inverse offset process expanding a pixel value range by the offset;
wherein the offset calculating unit performs the offset process for only the luma plane; and
the inverse offset calculating unit performs the inverse offset process for only the luma plane.

* * * * *